C. A. CURRIE.
APERTURE GATE.
APPLICATION FILED DEC. 5, 1913.
1,112,270.
Patented Sept. 29, 1914.
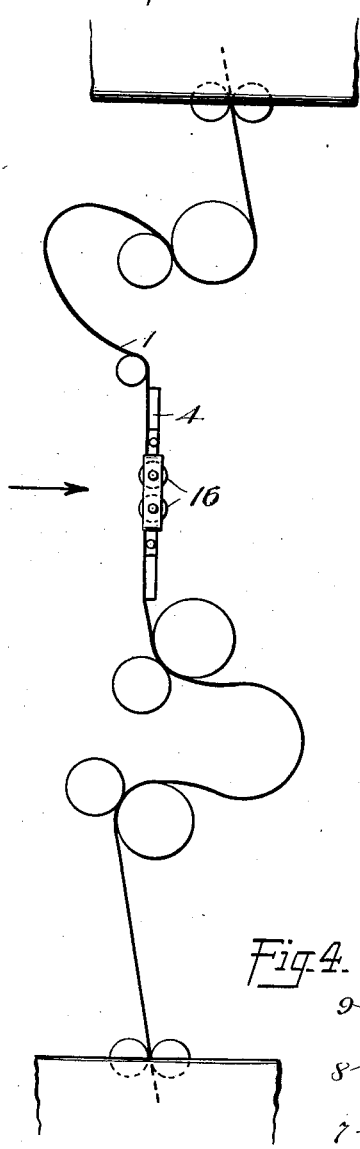
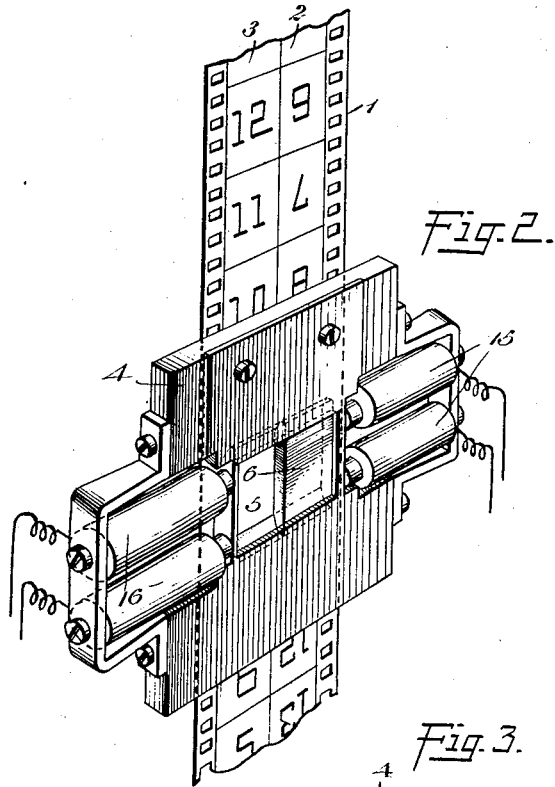
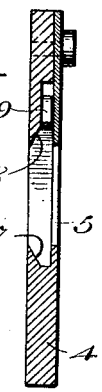
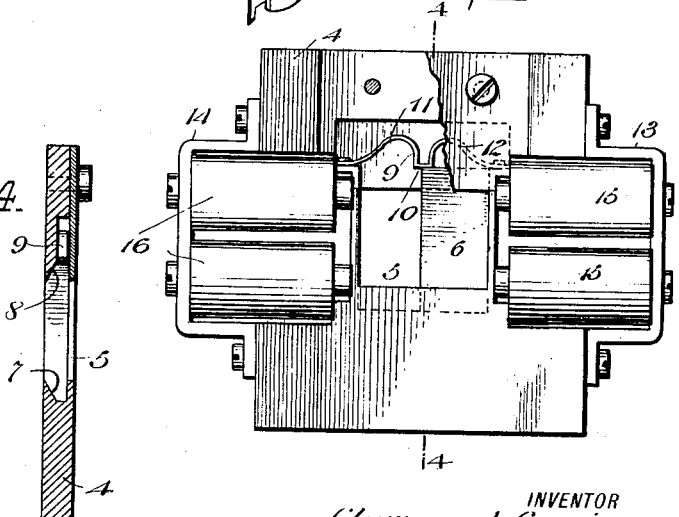
WITNESSES
INVENTOR
Clarence A. Currie
BY
ATTORNEYS

UNITED STATES PATENT OFFICE.

CLARENCE A. CURRIE, OF SOUND BEACH, CONNECTICUT.

APERTURE-GATE.

1,112,270.  Specification of Letters Patent.  Patented Sept. 29, 1914.

Application filed December 5, 1913. Serial No. 804,846.

*To all whom it may concern:*

Be it known that I, CLARENCE A. CURRIE, a citizen of the United States, and a resident of Sound Beach, in the county of Fairfield and State of Connecticut, have invented a new and Improved Aperture-Gate, of which the following is a full, clear, and exact description.

This invention relates to improvements in attachments for moving picture machines, and particularly to that part known as an aperture gate, and has for an object to provide an improved structure for use in connection with films provided with a plurality of rows of pictures.

A further object of the invention is to provide an aperture gate arranged with a sliding member of magnetizable material, and oppositely arranged magnets for moving the sliding member from one side to the other as occasion may demand.

In carrying out the object of the invention a suitable framework is provided in which a sliding member is arranged. This sliding member is designed to cover half of the aperture in the gate and to be moved by magnetic influence from one side to the other, whereby either series of pictures on the film may be disclosed to view.

In the accompanying drawings—Figure 1 is a diagram showing an arrangement of my improved aperture gate in connection with a film and various parts of a moving picture machine; Fig. 2 is an enlarged, detailed, perspective view of the aperture gate, part of a film being shown in connection therewith; Fig. 3 is a front view of the gate shown in Fig. 2, part of the same being broken away for illustrating the retaining spring; Fig. 4 is a section through Fig. 3 on line 4—4.

Referring to the accompanying drawing by numeral 1 indicates a film provided with a series of rows of pictures 2 and 3, series 2 being reversed to series 3 so that one series of pictures may be used as the film moves downward, and the other series of pictures may be used as the film moves upwardly. Arranged in front of the film 1 is an aperture gate 4 which is held in position in any desired manner. Gate 4 is provided with an opening 5, half of which is continually closed by a sliding member 6. Member 6 is arranged to slide in ways 7 and 8, and is held against accidental movement by spring 9, which has a bearing portion 10 resting on the upper edge of member 6. Spring 9 is preferably formed with bowed portions 11 and 12, and with the ends secured by any desired means, as for instance screws, to part of the housing or frame of gate 4. The housing or frame of gate 4 is made from brass, copper, or other non-magnetic material, while the sliding member 6 is made from soft iron or other suitable magnetizable material. Clamped on each side of the gate 4 are brackets 13 and 14 which support suitable magnets 15 and 16. These magnets are electromagets, and are designed to be energized alternately so that the movable member 6 may be positioned on either side of opening 5 so as to disclose to view either of the series of pictures 2 and 3. It will be evident that when magnets 15 are energized the movable member 6 will be in the position shown in Fig. 2, but when these magnets are deënergized and the opposite magnets 16 are energized member 6 will move over so as to be in front of the series of pictures 3. Any kind of means may be provided for closing the circuit of the respective magnets so as to cause member 6 to move over when the film begins a return or reverse movement. The circuit of these magnets may be closed manually, or they may be connected up with contacts on the film so that the reversing of the film will automatically cause a changing of the magnetic influence upon member 6.

In my co-pending application, Serial No. 791,528, filed September 24, 1913, will be found a mechanism of one form of means for reversing the film, and for providing contacts which can cause a reversing action of the magnets 15 and 16.

What I claim is—

1. In an aperture gate of the class described, a non-magnetic frame with an opening, a sliding member arranged in said opening and filling half thereof, and means for shifting the position of said sliding member from one side of said opening to the other.

2. An aperture gate comprising a non-magnetic frame formed with an opening, a movable member arranged in said opening, said movable member being made of magnetizable material, said movable member being of half the width of said opening, and magnetic means arranged to act on said movable member for causing the same to alternately fill different parts of said opening.

3. In an aperture gate of the class described, a sliding member for the aperture in the gate, and magnetic means for causing the sliding member to be shifted from one side to the other.

4. An aperture gate of the class described, comprising a non-magnetic frame formed with an opening for exposing the full width of a film having a plurality of series of pictures thereon, a sliding member arranged in said opening adapted to cover all of the series of pictures except one, said sliding member being of magnetic material, and electromagnets arranged on opposite sides of said frame adapted to alternately attract said sliding member.

5. In an aperture gate of the class described, a frame formed with an opening, a sliding member arranged in said opening, means for moving said sliding member from one side of the opening to the other, and resilient means pressing against said sliding member for frictionally resisting the movement thereof.

6. In an aperture gate of the class described, a frame of non-magnetic material provided with an opening sufficiently wide for accommodating a film having two series of pictures, a sliding member of magnetic material arranged in said opening adapted to cover one of said series of pictures, a spring pressing against said sliding member for resisting the movement thereof, and an electromagnet arranged on opposite sides of said frame for attracting said sliding member to opposite sides of said opening so as to disclose either of said series of pictures.

In testimony whereof I have signed my name to this specification in the presence of two subscribing witnesses.

CLARENCE A. CURRIE.

Witnesses:
A. L. KITCHEN,
G. H. EMSLIE.